United States Patent Office 2,779,140
Patented Jan. 29, 1957

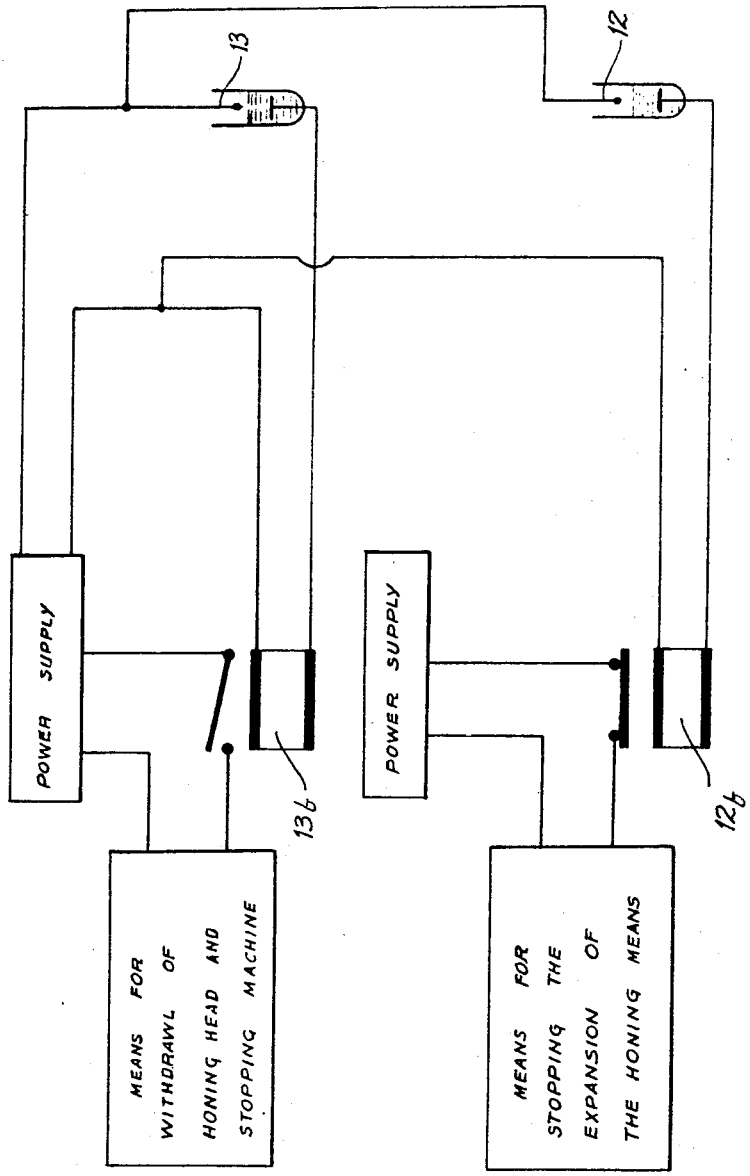

2,779,140

AUTOMATIC CONTROL DEVICE FOR MACHINE TOOLS

Leon Saives, Billancourt, France, assignor to Regie Nationale des Usines Renault, Billancourt, France Application July 17, 1953, Serial No. 368,753

Claims priority, application France January 19, 1953

6 Claims. (Cl. 51—165)

The object of the apparatus forming the subject of the present invention is to provide on machine tools, by means of a suitable electro-pneumatic system, the automatic checking of the work-piece and the automatic stopping of the machine as a function of variations in the dimensions of the machined part. It can be applied to certain machine tools and particularly to boring machines, internal grinders, honing machines or polishing machines, with a view to obtaining high precision and in particular the exact diameter of a bore.

Various devices for obtaining accurate bores are already known on certain machine tools such as boring machines, internal grinders, honing machines or polishing machines, the work of the tool (metal-cutting tool or abrasive tool) being arranged to stop automatically due to these devices when the required dimensions have been reached to within a certain tolerance. Nevertheless these devices have certain disadvantages resulting from their sluggish action and they do not make it possible to obtain the degree of precision which is desired.

The apparatus according to the invention makes it possible to obtain bores having a precision six or seven times greater than with the known devices, by using a combined electro-pneumatic control which:

(a) has a very short time-lag;

(b) constantly senses the dimensions obtained during the operation of the tools, the value of the dimension, as well as its variations, being readable at any moment on a highly magnified micrometric scale;

(c) automatically and instantaneously causes the operation of the tools to stop when the required dimensions have been obtained with a tolerance of ± 3 microns.

This device is based on the following principles:

During the machining, feelers are in contact with the surface or surfaces from which material is being removed. The modification in the distance between the feelers acts on a compressed air system, the pressure of which bears on columns of water. The variations in the level of the columns of water act on electric contacts which connect or disconnect the electric motors driving the parts of the machine.

One embodiment of a device according to the invention as applied to an automatic honing machine for engine cylinder liners will now be described with reference to the accompanying drawing in which:

Fig. 2 is a schematic diagram of a relay system for controlling the expansion of a honing tool and its withdrawal and for the stopping of the machine in accordance with the invention.

Figure 1:
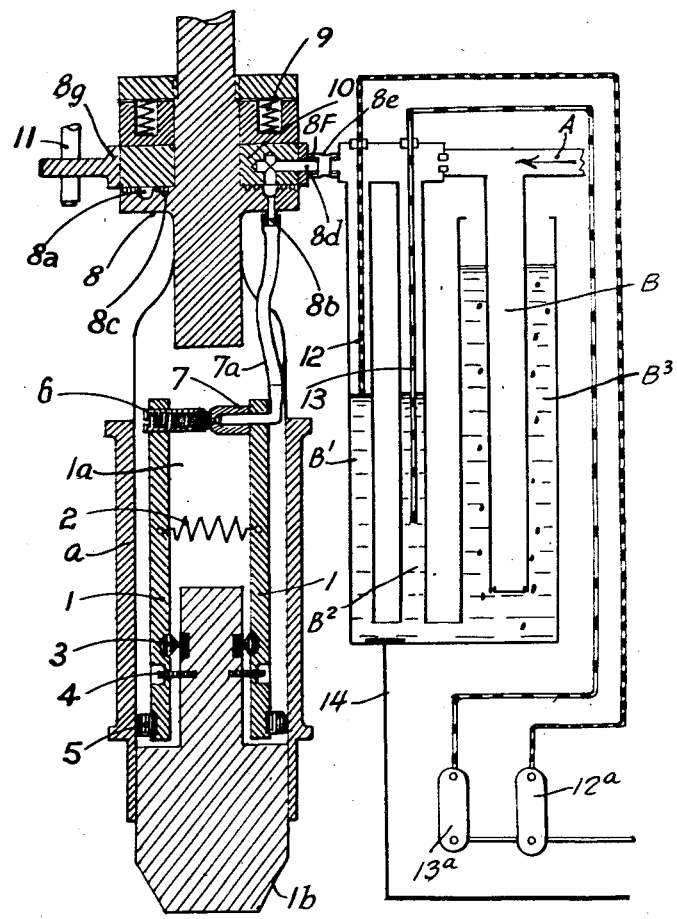
Figure 1 is a view, in elevation and partly in section, of the assembly of the part to be machined and of the apparatus in accordance with the invention.

In an expanding honing device $1a$, there is incorporated a device which comprises the following parts: Two balance arms 1, rocking on knife-edges 3 and pulled together by the spring 2, each carrying at their lower end a spherical-faced feeler 5, which continuously feels the bore of the liner $a$ during the operation. Each arm 1 is located longitudinally by a member 4 loose in its housing. One of the arms has at its upper end a regulating screw 6 and the other has a nozzle 7, connected by means of a flexible pipe $7a$ to a rotating joint. The magnification ratio of the balance arms 1 may be greater than unity so as to improve the sensitivity of the system. In the apparatus shown by way of example it is of the order of three to one.

The rotating joint comprises a rotating member 8 which is integral with the honing device, and in which there are provided a feed groove $8a$, connected to the nozzle by means of the passage $8b$, and four sealing grooves $8c$. The fixed part of the joint consists of a graphite ring 10 which is urged against the rotating member 8 by the springs 9, and in which there is provided a passage $8d$, opening into the passage $8a$ and communicating by means of a resilient tube $8e$ joined to a nozzle $8^f$ of a guiding ring $8^g$ and vertically movable on a fixed rod 11, with a pneumatic micro-measuring device giving two readings, which can be fed with compressed air through passages A and B.

Each of the columns of water $B^1$, $B^2$ in the micro-measuring device, fed by the reservoir B3 establishes a liquid contact by means of an electrode dipping into coloured water. In the example of the honing machine, the electrode 12 controls, by means of a relay system, the stopping of the expansion of the honing means $1b$, and the electrode 13, which dips down further, controls the withdrawal of the honing head and the stopping of the machine. The height of the electrodes can be adjusted. They are connected to devices $12a$, $13a$ at one of the poles of a source of electric current the other pole of which is connected to a terminal 14 which is immersed in the liquid of columns $B^1$, $B^2$.

In the example chosen, the device operates as follows: After the liner $a$ has been mounted by the operator and the machine has been started, the honing head guided on rod 11 enters the liner and the honing takes place by progressively expanding the honing means. The feelers 5 move apart as a result of the increase in the bore, thus bringing the screw 6 and the nozzle 7 closer together. The supply of air from the nozzle 7 is thus reduced, the air pressure increases in the micro-measuring device and causes the columns of water to sink. When the contact between the column of water and the electrode 12 is broken, the expansion of the honing means stops and it is the polishing operation which continues until the required dimension is obtained and the honing head stops working as a result of the breaking of the contact between the column of water and the electrode 13.

The device described above has the advantage, in comparison with the system using a floating calibrated ring, of being more sensitive and therefore more precise. Thus the tolerance measured on parts bored by means of the present device is about ±3 microns, whereas it was about ±20 microns with the old system using a floating calibrated ring.

I claim:

1. A grinding machine comprising: an expanding honing tool for bores; a rotating mandrel integral with said tool and providing connection means to a driving source for said tool; a pair of lever arms yieldingly mounted on said mandrel as to be carried along with said tool; spherical-faced feelers mounted on one end of each lever arm and being disposed closely adjacent to said tool; means to keep the yieldingly mounted lever arms spread apart at the ends carrying said feelers so as to keep said feelers in constant and continuous contact with the work being ground while opposite ends of said lever arms move closer together; means for causing a stopping of expansion of said tool so as to stop honing but continue polishing and subsequently stopping rotation of said tool when proper work dimensions obtain; said means including a fluid line under pressure, a nozzle mounted on one of said lever arms on the end opposite to the feelers; said nozzle having connection means to said fluid line to discharge fluid therefrom, an adjusting element mounted on the other lever arm directly confronting said nozzle and co-operating therewith to vary the flow from said nozzle so as to vary the pressure in said fluid line, a rotating joint on said mandrel, a flexible conduit rotatably mounted on said joint and providing connection means from said nozzle to said joint, said rotating joint including a stationary member providing connection means from said flexible conduit to said fluid line, said stationary member also providing means for guiding said tool in the work being ground.

2. A grinding machine according to claim 1, in which said means for causing a stopping of the expansion of said tool so as to stop honing but continue polishing and subsequently stopping rotation of said tool when proper work dimensions obtain also including: a micromanometer device with connection means to said fluid line under pressure; said micromanometer device comprising an electric conductive liquid therein, a series of electric contacts disposed at different distances from the surface of said liquid and energizing and deenergizing electrical circuits to control the various grinding and polishing operations of said tool when said liquid surfaces rise or fall due to the pressure variations caused in said fluid line and said micromanometer device by the rate of discharge from said nozzle.

3. A grinding machine according to claim 1, in which said yieldingly mounted lever arms comprise a short and long dimension and being provided with knife-edges as fulcrums, said knife-edges being so disposed on said lever arms as to be spaced from the mid-point on said long dimension and close to the ends carrying said feelers such that slight movement of the lever arms at the feeler ends causes a magnified movement at the opposite ends.

4. A grinding machine according to claim 3, in which said nozzle and said co-acting and adjusting element vary the flow from said nozzle in accordance with the magnified movement of said lever arms at the ends carrying said screw and said nozzle.

5. A grinding machine according to claim 1, in which said rotating joint comprising; a rotating member, and said stationary member, said rotating member comprising a collar on said mandrel, said stationary member comprising a ring having a low coefficient of friction arranged around said mandrel and overlying said collar, means to keep said stationary member in close contact with said rotating member, connecting means between said fluid line and said nozzle through said flexible conduit rotatably mounted on said rotating member, said connecting means comprising a system of passageways, said system comprising a passageway in said stationary member having connection at one end with said fluid line and ending in direct alignment with a passageway in said rotating member, said flexible conduit connecting with said system of passageways at said rotating member, a system of sealing grooves, comprising a plurality of annular recesses encircling said passageway in said rotating member and cooperating with each other and said stationary member such that a tight fluid connection is maintained between said rotating member and said stationary member.

6. A grinding machine comprising: an expanding honing tool for bores, a rotating mandrel integral with said tool and providing connection means to a driving source for said tool; a pair of lever arms yieldingly mounted on said mandrel as to be carried along with said tool; spherical-faced feelers mounted on one end of each lever arm and being disposed closely adjacent to said tool; means to keep the yieldingly mounted lever arms spread apart at the ends carrying said feelers so as to keep said feelers in constant and continuous contact with the work being ground while opposite ends of said lever arms move closer together as the diameter of the bore being ground increases; means for causing a stopping of expansion of said tool so as to stop honing but continue polishing and subsequently stopping rotation of said tool when proper work dimensions obtain, said means being controlled by said feelers, said yieldingly mounted lever arms having a short and long dimension and being provided with knife-edges as flucrums, said knife-edges being so disposed on said lever arms as to be spaced from the mid-point on said long dimensions and close to the feeler ends such that slight movement of the lever arms at the feeler ends causes a magnified movement at the opposite ends to sensitively and accurately control said last mentioned means.

References Cited in the file of this patent

UNITED STATES PATENTS

| | | |
|---|---|---|
| 1,927,750 | Mennesson | Sept. 19, 1933 |
| 1,985,576 | Mennesson | Dec. 25, 1934 |
| 2,001,447 | Balsiger | May 14, 1935 |
| 2,007,507 | Steiner | July 9, 1935 |
| 2,026,187 | Mennesson | Dec. 31, 1935 |
| 2,143,454 | Schmidt | Jan. 10, 1939 |
| 2,284,325 | Kline | May 26, 1942 |
| 2,559,431 | Hollengreen et al. | July 3, 1951 |
| 2,631,414 | Muehling | Mar. 17, 1953 |

OTHER REFERENCES

Publication: American Machinist, May 22, 1947, page 162.